United States Patent [19]

McShirley

[11] Patent Number: 4,512,339
[45] Date of Patent: Apr. 23, 1985

[54] PERCUSSOR APPLICATION

[75] Inventor: Robert C. McShirley, Glendale, Calif.

[73] Assignee: McShirley Products, Inc., Burbank, Calif.

[21] Appl. No.: 257,373

[22] Filed: Apr. 24, 1981

[51] Int. Cl.³ .............................................. A61H 1/00
[52] U.S. Cl. ........................................ 128/41; 310/23
[58] Field of Search ...................... 128/41, 42, 43, 53, 128/55, 52; 310/23, 30, 34; 335/263; 361/103, 104

[56] References Cited

U.S. PATENT DOCUMENTS

| | | | |
|---|---|---|---|
| 608,175 | 8/1898 | Casler | 310/30 |
| 1,837,197 | 12/1931 | Berman | 128/41 |
| 3,096,758 | 7/1963 | Savage | 128/41 |
| 3,517,360 | 6/1970 | Gray | 310/30 |
| 3,643,117 | 2/1972 | Alger | 310/30 |
| 4,069,816 | 1/1978 | Yamamura | 128/41 |
| 4,280,161 | 7/1981 | Kuhn et al. | 361/104 |
| 4,325,222 | 4/1982 | Nakamura et al. | 361/104 |

FOREIGN PATENT DOCUMENTS

| | | | |
|---|---|---|---|
| 912481 | 5/1954 | Fed. Rep. of Germany | 310/30 |
| 753157 | 10/1933 | France | 128/52 |
| 860777 | 2/1961 | United Kingdom | 310/23 |

Primary Examiner—Kyle L. Howell
Assistant Examiner—Francis J. Jaworski
Attorney, Agent, or Firm—Blakely, Sokoloff, Taylor & Zafman

[57] ABSTRACT

A percussor apparatus employing a reciprocal motor with improved performance characteristics is disclosed. The reciprocal motor is comprised of an armature, a solenoid or coil, a magnetic frame encompassing the armature and solenoid, and means for resiliently holding the armature in a position partially outside a magnetic field produced by the solenoid when an appropriate electrical signal is applied to the solenoid. Resilient bumpers which limit the travel of the armature as it reciprocates are disposed in a manner which enable the magnetic frame to form a substantially complete magnetic circuit for the magnetic field.

Additionally, a bearing surface formed at the solenoid armature interface is adapted to allow the armature to reciprocate, and substantially eliminate any rotation of the armature about its longitudinal axis. Power supply means utilizing solid state technology is mounted within the housing containing the reciprocal motor. Thermal protection means comprising a flashing warning light and a shut off switch are also provided.

7 Claims, 10 Drawing Figures

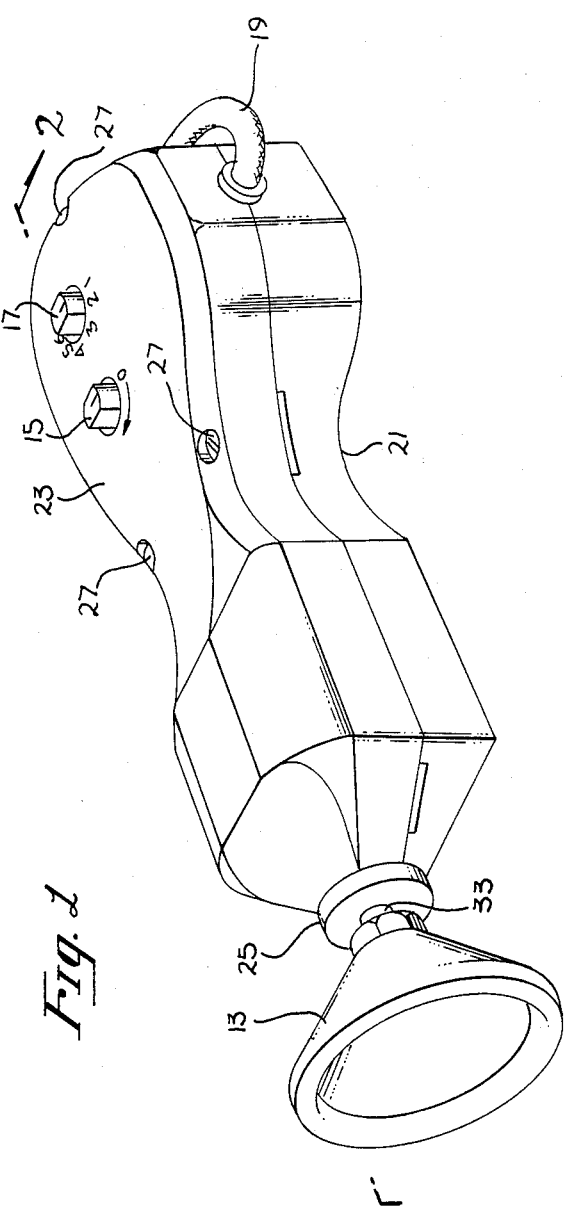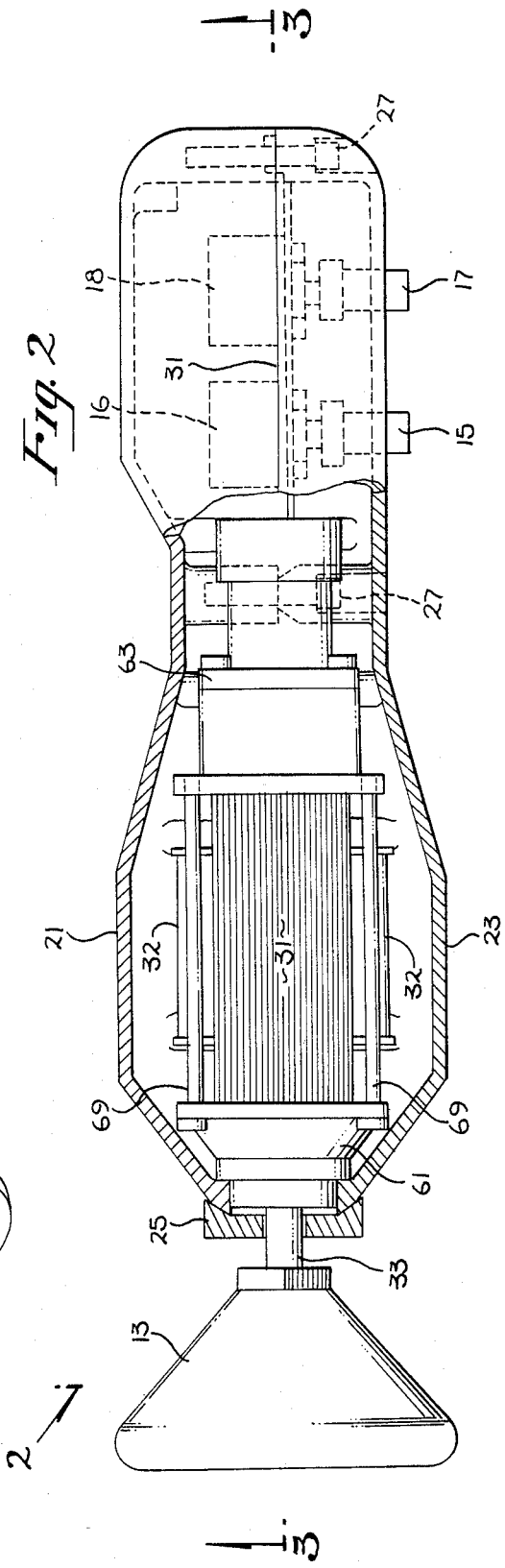

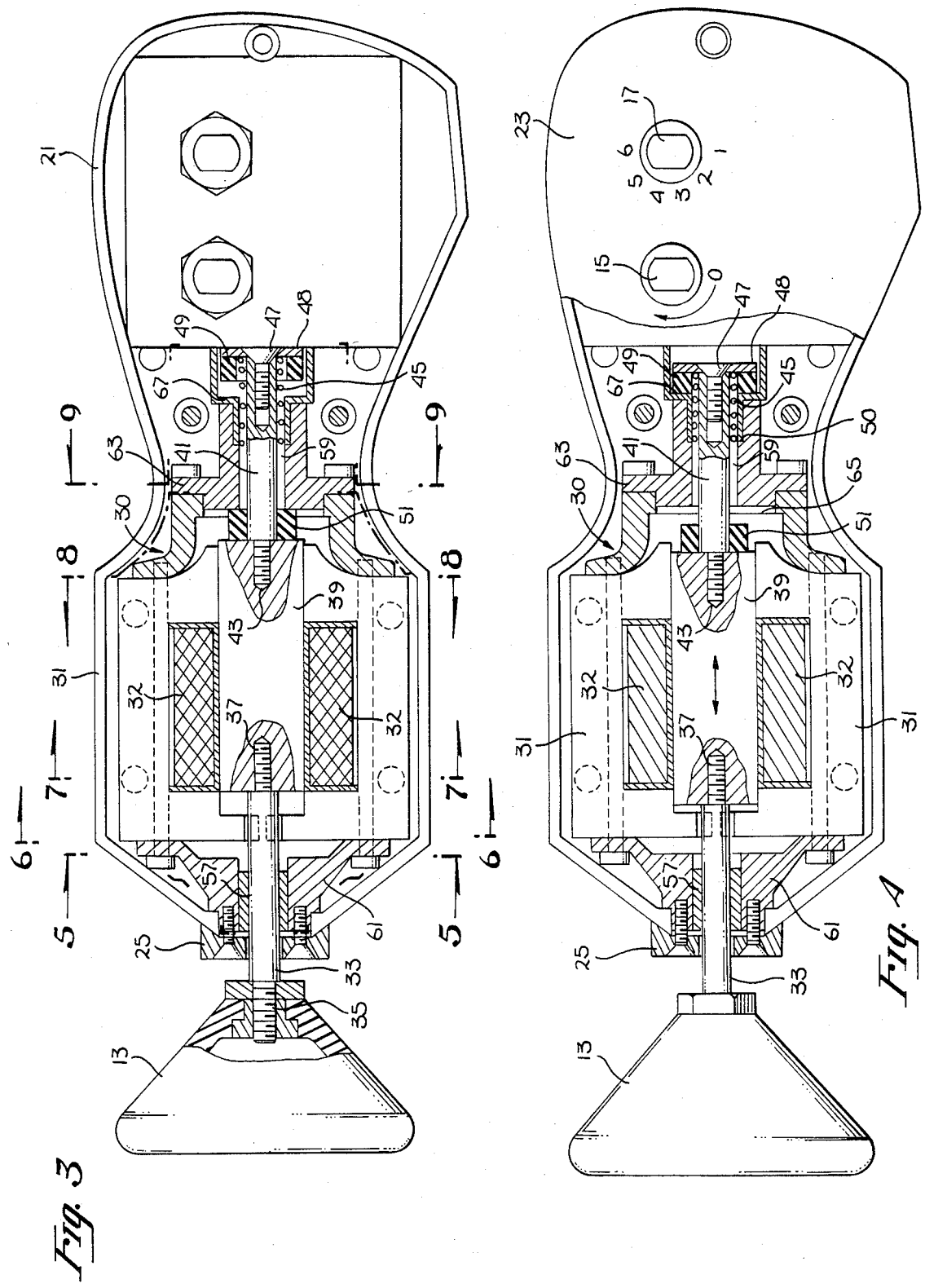

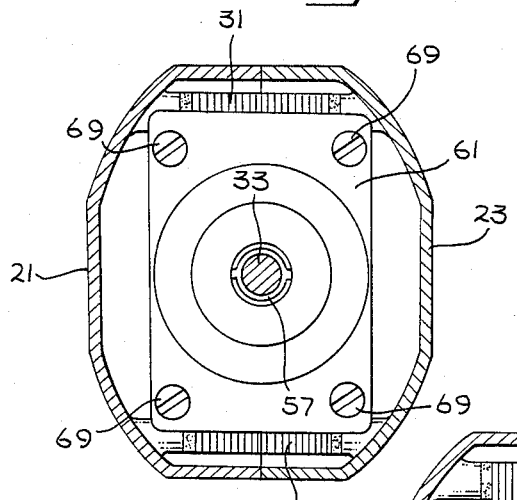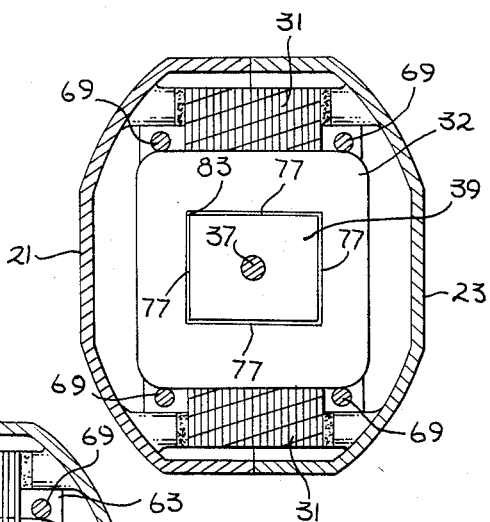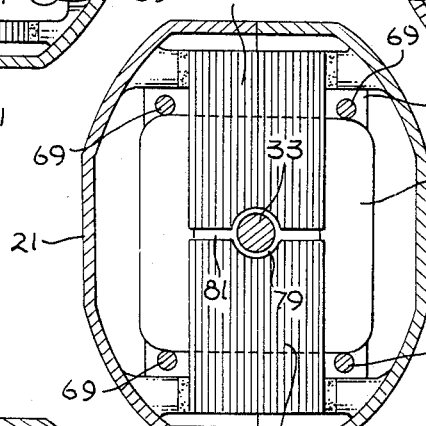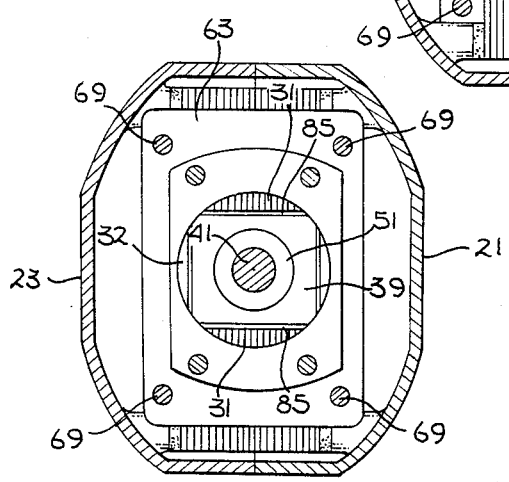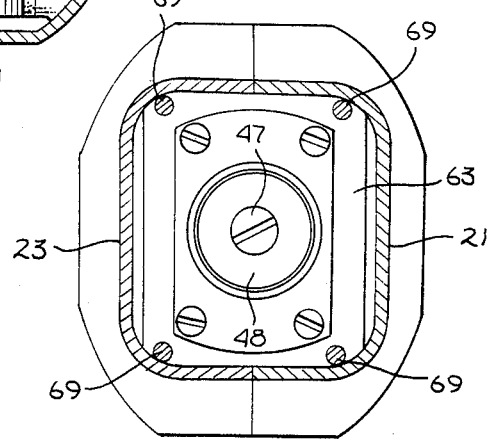

PERCUSSOR APPLICATION

PRIOR ART

In U.S. Pat. No. 2,581,806, a percussor apparatus wherein the reciprocal motion of an applicator held in contact with the body of a patient is produced by a reciprocating motor mechanism is described. Other types of prior art percussor apparatuses utilize a rotary motor and the reciprocal motion of the applicator is obtained by means of mechanical linkages such as a cam or crank. However, devices of this nature do not impart the sharp, quick blow or stroke needed to obtain maximum advantage from percussion techniques. For example, if a cam is utilized to convert the rotary motion of the motor to reciprocal motion, the velocity of the applicator generally decreases as the applicator nears its topmost position. This occurs because the motor rotates at a constant speed, while the shape of the cam dictates that the applicator approach zero velocity as it reaches its highest point. When a reciprocal motor is utilized, the applicator is accelerating as it approaches its topmost position, thereby providing a sharp, quick blow.

In prior art percussor apparatus which utilize a reciprocal motor the applicator is coupled to an armature which moves back and forth within a solenoid mechanism. The kinetic energy obtained by the moving armature is, of course, transmitted to the applicator. The armature is held in the "back" position by a spring such that when an appropriate electrical signal is applied to the solenoid, the magnetic field created thereby overcomes the force of the spring and pulls the armature forward into the solenoid. When the electrical signal is removed, the armature continues its forward motion due to the kinetic energy imparted to it by the magnetic field. A bumper, formed from a resilient material at the leading edge of the armature, hits a barrier thereby absorbing the remaining kinetic energy. Once the kinetic energy is dissipated, the spring pulls the armature back into its original position until such time as an appropriate electrical signal is again applied to the solenoid, whereupon the armature repeats the above-described cycle.

One of the major problems encountered in the prior art is that, as may be seen, for example, in FIG. 4 of U.S. Pat. No. 2,581,806, a front bumper 39 (buffer) is disposed at an end of the armature nearest the applicator. This bumper is adapted to engage the bottom 40 of a recess formed in an end plate 5. Pole pieces 15 and 16 form a magnetic frame surrounding the solenoid 20. The two pole pieces at a position adjacent the bumper 39, are separated by a distance which is large enough to adversely affect the strength of the magnetic field at that point. Obviously, this space is needed to accommodate the buffer 39 when the armature moves forward. This space causes a weakening of the magnetic field which pulls the armature into the solenoid. This weakened magnetic field prevents the applicator from obtaining a velocity sufficient to produce a force necessary when treating certain disorders.

In the prior art apparatus, the armature reciprocates in a passageway in the coil or solenoid which is large enough to accomodate the armature such that, during its motion, the armature does not contact the walls within the solenoid which define the passageway. When an electrical signal is applied to the solenoid in a prior art percussor, the magnetic field created thereby tends to rotate the armature about its longitudinal axis. Thus, although the armature and the passageway in the prior art may be approximately rectangular in shape, the armature still rotates to the extent that the passageway in the solenoid is too large. This rotational tendency of the armature further decreases the available force to be transmitted to the applicator.

The power supply used to control a prior art percussor apparatus which uses a reciprocal motor, incorporates components which due to their size and ability to withstand vibration reside in a separate box from the percussor apparatus itself. Thus, a prior art percussor apparatus is plugged into a separate power supply which is then plugged into an appropriate electrical source. Additionally, the vacuum tube technology utilized in the prior art makes it difficult to control the amplitude and frequency of pulses, produced by the power supply, independently of each other. One reason this occurs is that the amplitude and frequency of the pulses produced by the prior art power supply are not independent of each other.

As will be seen, the present invention solves the above discussed limitations of the prior art. In particular, the present invention teaches a percussor apparatus which utilizes bumpers to limit the travel of the armature, which bumpers are disposed so as to allow the magnetic frame to form a complete magnetic circuit; means for substantially eliminating any rotational tendency of the armature about its longitudinal axis; means for providing thermal protection of the apparatus and wherein the power supply of the apparatus is enclosed within the same housing as the reciprocal motor which imparts the percussive strokes, which power supply provides improved operating characteristics.

SUMMARY OF THE INVENTION

A percussor apparatus employing a reciprocal motor with improved performance characteristics is disclosed. The reciprocal motor is comprised of an armature, a solenoid or coil, a magnetic frame encompassing the armature and solenoid, and means for resiliently holding the armature in a position partially outside a magnetic field produced by the solenoid when an appropriate electrical signal is applied to the solenoid. Resilient bumpers which limit the travel of the armature as it reciprocates are disposed in a manner which enable the magnetic frame to form a substantially complete magnetic circuit for the magnetic field. This is accomplished by placing the bumpers on an end of the armature, opposite from the end thereof which is coupled to an applicator, which imparts percussive strokes to a patient.

The reciprocal motor is constructed in a manner utilizing a solenoid which has an opening through its longitudinal axis, of rectangular cross-section which forms a bearing surface with the armature. The armature is of like rectangular cross-section. This construction substantially eliminates any tendencies of the armature to rotate about its longitudinal axis when the solenoid is energized.

Rods or shafts extending from the ends of the armature are coupled to the armature such that the longitudinal axis of each rod and the armature are substantially identical. This is accomplished by employing a method of construction wherein the rods are loose threaded into the armature, properly aligned and then epoxyed permanently into place. A warning light is disposed on the exterior of the housing assembly, which light provides a warning when the reciprocal motor is beginning to overheat from being in use for too long a period of time. Means are also provided for automatically shutting off the apparatus when a predetermined operating temperature is reached in order to protect the apparatus. Power supply means utilizing solid state technology is mounted within the housing assembly containing the reciprocal motor.

BRIEF DESCRIPTION OF THE DRAWINGS

FIG. 1 is a perspective view of an embodiment of the apparatus.

FIG. 2 is a sectional view of the apparatus taken along line 2—2 of FIG. 1.

FIG. 3 is a sectional view of the apparatus taken along line 3—3 of FIG. 2.

FIG. 4 is a view of the apparatus, partially cut away, to show the position of the armature when an appropriate electrical signal is applied to the solenoid.

FIG. 5 is a sectional view taken along line 5—5 of FIG. 3.

FIG. 6 is a sectional view taken along line 6—6 of FIG. 3.

FIG. 7 is a sectional view taken along line 7—7 of FIG. 3.

FIG. 8 is a sectional view taken along line 8—8 of FIG. 3.

FIG. 9 is a sectional view taken along line 9—9 of FIG. 3.

FIG. 10 is a circuit diagram of a circuit used to control the frequency and power of the apparatus.

DETAILED DESCRIPTION OF THE INVENTION

Figure 40:
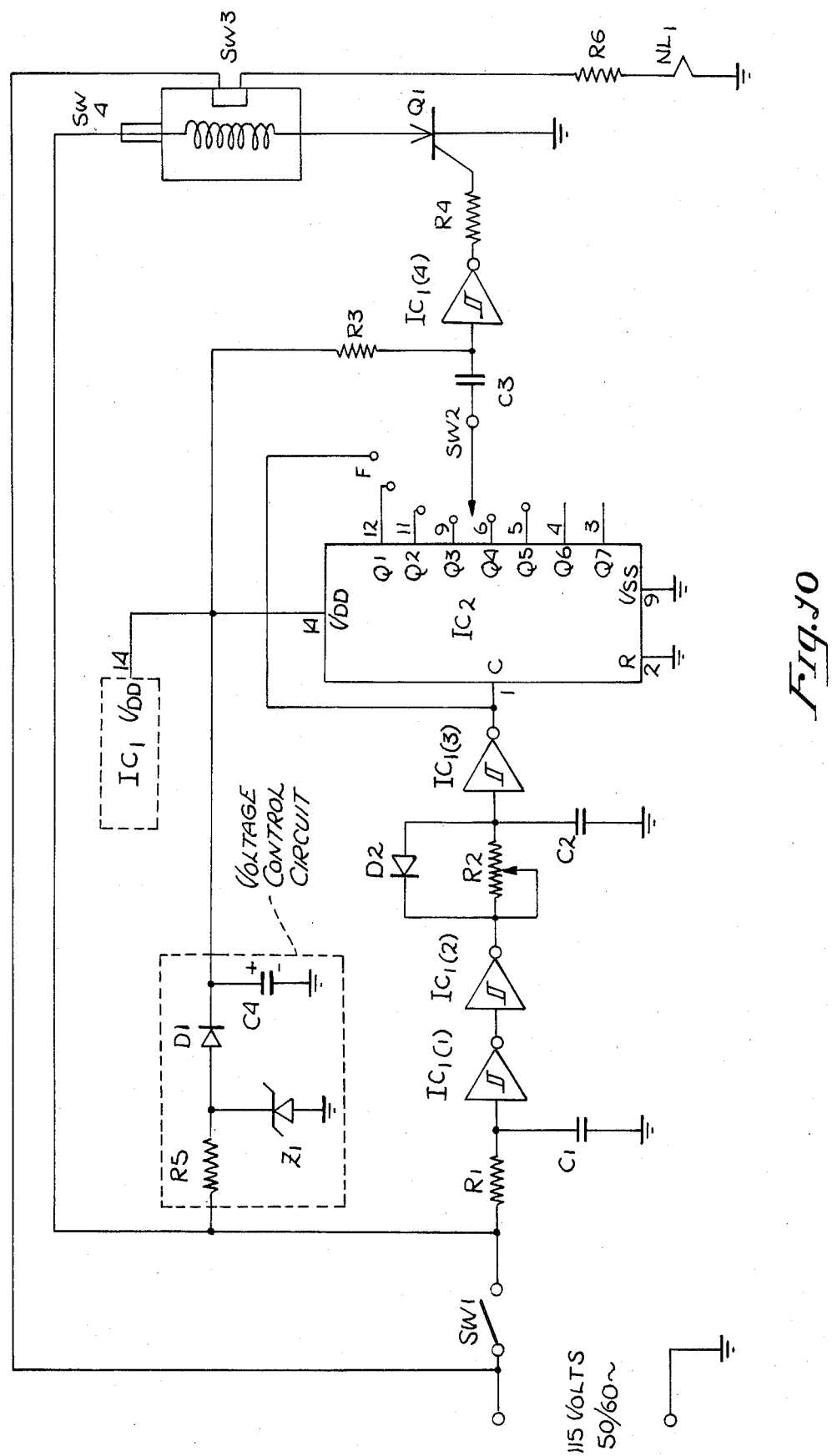

Referring to FIGS. 1 and 2, an embodiment of the disclosed percussor apparatus 11 is shown. The apparatus is enclosed within housing members 21 and 23. Three screws 27 hold the two housing members together. Applicator 13, which may be interchanged depending on the type of treatment being performed, is threadedly coupled to a shaft 33 extending through shaft collar 25 at what will be referred to as the front of the apparatus. Power is supplied to the apparatus by power cord 19 which passes through an opening adjacent what will be referred to as the rear of the apparatus. Knobs 15 and 17 protrude through housing member 23 adjacent the rear of the apparatus. These knobs are coupled to rheostat 16 and switch 18, which control the power and frequency respectively imparted to the applicator 13 during operation of the apparatus. Additionally, rheostat 16 incorporates an on/off switch.

The details of the reciprocal motor assembly 30 enclosed within housing members 21 and 23 may best be described by referring now to FIG. 3. Magnetic frame 31 is formed by two approximately U-shaped members which partially surround coil or solenoid 32. These U-shaped members are formed from laminations of soft iron according to well-known techniques. Solenoid 32 has an opening through its longitudinal axis to receive an armature 39, which like the magnetic frame 31 is formed from laminations of soft iron. A shaft 33 couples one end of the armature 39 to applicator 13. Applicator 13 is secured to shaft 33 by screw 35, which is received by a threaded opening, longitudinally disposed at an end of shaft 33. A shaft 41 couples the other end of armature 39 to compression spring 45. Compression spring 45 is secured to shaft 41 by screw 47, which is received by a threaded opening, longitudinally disposed at an end of shaft 41. A washer 48 is disposed between the head of screw 47 and shaft 41, which washer acts as a stop for one end of spring 45. A barrier 50 disposed intermediate the ends of shaft 41 acts as a stop for the other end of spring 45. The two shafts 33 and 41 are threaded at ends 37 and 43, respectively, which ends are coupled to the armature 39.

Bumper 49 is a resilient collar, which surrounds shaft 41 at the end thereof adjacent washer 48. Bumper 51, which is also a resilient collar, surrounds shaft 41 adjacent the armature 39.

Further details of the reciprocal motor assembly may be described in connection with FIG. 2. Magnetic frame 31 is disposed between end cap 61 adjacent the front of the apparatus and end cap 63 disposed intermediate the front and rear of the apparatus. End caps 61 and 63 are coupled to each other by four screws 69 as seen in FIGS. 5 and 9 thereby securing the entire reciprocal motor assembly 30.

Referring again to FIG. 2, bearing surface 57 is a bore through the longitudinal axis of end cap 61 adapted to receive shaft 33. Similarly, bearing surface 59 is a bore through the longitudinal axis of end cap 63 adapted to receive shaft 41.

The operation of the device may be described as follows, in conjunction with FIGS. 3 and 4. As long as there is no electrical signal applied to the solenoid 32, the armature 39 is held by compression spring 45 in what will be referred to as the "in" or "retracted" position. In this position, the armature is partially outside a magnetic field which is generated when an appropriate electrical signal is applied to the solenoid 32.

Upon applying an appropriate electrical signal to the solenoid, the magnetic field thereby produced tends to pull the armature into the magnetic field formed by the solenoid 32 and the magnetic frame 31 towards what will be referred to as the "out" position. The travel in this first direction continues approximately until the electrical signal is removed from the solenoid 32, or the applicator strikes an object or bumper 49 strikes barrier 67 as best seen in FIG. 4. Barrier 67 is disposed approximately 0.140 inch from the surface of bumper 41 which contacts the barrier 67, this distance of course measured when the armature 39 is in the retracted position.

It will be appreciated that washer 48 in addition to acting as a stop for spring 45 as discussed above, also prevents bumper 49 from sliding off shaft 41 upon striking barrier 67. In actual operation, the electrical signal is removed from the solenoid prior to either the applicator striking an object or the bumper 49 striking barrier 67. The kinetic energy imparted to the armature by the pull of the magnetic field causes the armature to continue its travel after the electrical signal is removed until one of the above-described events occur. At such time, compression spring 45 pulls the armature back to the retracted position. The travel in this second direction is limited by bumper 51 which strikes barrier 65 prior to the releasing of tension from spring 45. Of course, if the frequency with which the electrical signal is applied to solenoid 32 is sufficiently high, the armature will be pulled into the solenoid prior to bumper 51 striking barrier 65. Thus, the armature attains a reciprocal motion as the magnetic field pulls the armature into the solenoid and after the electrical signal is removed, the spring pulls the armature out of the solenoid. This reciprocal motion continues at a frequency determined by the frequency with which the electrical signal is applied to the solenoid 32 and at a power level proportional to the voltage of the electrical signal. The power and frequency of the electrical signal may be varied by rheostat 16 and switch 18 respectively.

Certain details of the construction of the preferred embodiment of the apparatus will now be described in connection with FIGS. 6 through 9. As shown in FIG. 6, the two pole pieces of the magnetic frame 31 each wrap around shaft 33. The aperture 79, adjacent shaft 33 through the two pole pieces, should be wide enough to allow passage of shaft 33 therethrough without contacting the shaft. The space 81 between the pole pieces, adjacent the aperture 79 separates the two pole pieces by a distance which is sufficient to preclude contact with each other, but not so wide as to adversely affect the generated magnetic field. The space 81 between the pole pieces is approximately 3/32" and the diameter of the aperture 79 is approximately 5/16" for a ¼" shaft. Thus, the distance separating shaft 33 from each of the pole pieces is approximately 1/16". By having this relatively small separation between the pole pieces, the strength of the magnetic field created by the solenoid and pole pieces is substantially increased over a prior art reciprocal motor which requires a relatively large separation between the pole pieces in order to allow passage of the prior art bumper. It is important that the magnetic field be as strong as possible because the force which is transmitted to the applicator is, of cource, proportional to the strength of the magnetic field.

Referring now to FIG. 7, details of the solenoid construction will be described.

The solenoid 32 is a glass filled, 10 ohm coil, "105C" Class A. The aperture through the longitudinal axis of the solenoid is approximately rectangularly shaped, approximately 15/16" on the longer sides and approximately 5/8" on the shorter sides. A bearing surface 77 formed between the rectangularly shaped aperture 83 and the armature 39 allows the armature to reciprocate within the aperture, but substantially eliminates any tendency of the armature to rotate about its longitudinal axis. The armature is ground to approximately 0.001 inch tolerance and is custom fit for the aperture 83 of each solenoid.

Shaft 33 terminates at one end with threads 37 which threadedly engage armature 39 in an aperture which is on the longitudinal axis of the armature. In a similar manner, shaft 41 threadedly engages the opposite end of armature 39. The receiving threads on each end of the armature 39 are cut so as to allow the armature to receive the threaded ends of the shafts 39 and 41, but the shafts retain some freedom of movement by virtue of the receiving threads being slightly wider than necessary for a given screw diameter. In this manner the shafts 39 and 41 may be aligned on a common longitudinal axis and then the threaded portions 37 and 43 are epoxyed to the armature.

Referring now to FIG. 8, further details of the rear portion of the reciprocal motor assembly will be described. The magnetic frame surrounds the armature 39 on two sides. Space 85 separates the magnetic frame 31 pole pieces from the respective sides of armature 39. In the preferred embodiment, a clearance of approximately 0.003 inch exists between the magnetic frame and the armature at space 85.

Additionally, contacting surfaces of the magnetic frame with the end caps 61 and 63 are ground so as to insure proper alignment of the pieces when fully assembled. That is, the longitudinal axis of the shafts and apertures must be substantially identical. Alignment pins, which are not shown, are inserted through the end caps during the construction of the apparatus to aid in obtaining proper alignment.

The solenoid, once properly aligned within the magnetic frame, is epoxyed permanently into place.

The circuit shown in FIG. 10 provides means for producing pulses of varying amplitude and frequency to solenoid 32 such that the amplitude and frequency are independent of each other.

Line voltage (110 V.A.C) is input to on-off switch SW1. Voltage control circuit 1 shown in shadow lines converts the line voltage to a 10 volt, direct current, 150 micro amp signal for driving the CMOS circuitry shown in FIG. 10.

Voltage control circuit 1 comprising zener diode Z1, resistor R6, diode D1 and capacitor C4 maintains the signal at 110 volts despite wide variations in line voltage according to well known techniques.

Integrated circuit $IC_1$, (Motorola MC 14584B or equivalent) comprises six identical inverting Schmidt triggers. Thus, each of $IC_{1(1)}$–$IC_{1(4)}$ comprises one-sixth of $IC_1$. The sinusoidal input waveform is reduced in amplitude by resistor R1 and capacitor C1 to an appropriate level and input to Schmidt trigger $IC_{1(1)}$ which outputs a square wave, 180 degrees out of phase with its input. Schmidt trigger $IC_{1(2)}$ puts the square wave back in phase with the original input. The output from Schmidt trigger $IC_{1(2)}$ is input to a time delay circuit comprising resistor R2, capacitor C2 and diode D2 which produces a ramp output delayed from the zero crossing point of the square wave input to it. The delay is determined by the time constant of the R2-C2 combination. Resistor R2 (also referred to as rheostat 16) is a variable resistor, adjustable from 0 to 250K ohms. By varying resistor R2, the length of the ramp output and the corresponding amplitude which it attains may be varied.

The ramp output is then input to Schmidt trigger $IC_{1(3)}$ which "squares up" the ramp resulting in a pulse of the same frequency as line input, i.e., 60 Hz, and amplitude dependent for the most part on the values of resistors R1 and R2.

The pulse output from Schmidt trigger $IC_{1(3)}$ is then input to integrated circuit $IC_2$ (Motorola MC 14024B or equivalent) which is a seven stage (only five of which are used herein) ripple counter. The output of the ripple counter is a square wave with a frequency of $\frac{1}{2}^N$ of the input frequency where N ranges from 1 to 5 selectable by switch SW1. Of course integrated circuit $IC_2$ may be by-passed resulting in a signal with the same frequency as the input frequency.

The output of integrated circuit $IC_2$ (or Schmidt trigger $IC_{1(3)}$) is then differentiated by resistor-capacitor combination R3—C3 to produce pulses at the negative edge of the signal input to the R3—C3 combination.

Schmidt trigger $IC_{1(4)}$ receives the resulting waveform and acts as an inverting buffer to drive the gate of silicon controlled rectifier Q1 which energizes solenoid 32 at the frequency, and proportional to the amplitude of the above described circuit.

Although not part of the above-described pulse amplitude-frequency control circuit, a thermal-protection circuit comprising warning switch SW8, protection switch SW4 neon light $NL_1$ and resistor R6 are also shown in FIG. 9 for convenience.

Warning switch SW3 (Texas Instruments 6786-1) is coupled to solenoid 32. When a temperature of 90° C. is reached, switch SW3 causes neon light NL₁ to flash three times per second. When a temperature of 98° C. is reached, switch SW4 (3M MTP Series WA-098) permanently shuts off the current energizing solenoid 32 in order to protect the apparatus. Of course, switch SW4 may be replaced.

Thus, a medical percussor apparatus having improved performance characteristics has been described. When the solenoid is energized, the resulting magnetic circuit is substantially complete because the two pole pieces which form the magnetic frame surrounding the solenoid are separated by a relatively small distance. Further improvements include means for substantially eliminating any rotational tendency of the armature about its longitudinal axis, means for providing thermal protection for the apparatus and a power supply which is contained in the same housing as the apparatus and which allows independent control of the power and frequency of percussive strokes.

I claim:

1. In a hand held therapeutic percussor apparatus having an applicator, reciprocal motor means for imparting a reciprocal motion to said applicator, power supply means for controlling the frequency and power of said reciprocal motion, said motor means including an armature, a first shaft coupled at a first end to a first end of said armature and coupled at a second end to said applicator, a second shaft coupled at a first end to a second end of said armature, wherein said first shaft, said second shaft and said armature are substantially aligned along the same longitudinal axis, a means for resiliently holding said armature in a predetermined position, the improvement comprising:

a solenoid having an opening defined along its longitudinal axis;

a magnetic frame substantially surrounding said solenoid, said magnetic frame defined by two pole pieces, said frame having a single substantially rectangular opening at one end thereof adjacent to said first shaft, such that each said pole piece is separated from said shaft by a preselected distance, wherein said rectangular opening has approximately the same cross-sectional area as the cross-section of said armature, and wherein the contacting surface of said armature and said solenoid form a bearing surface such that said armature is constrained from rotational movement about its longitudinal axis;

a first resilient bumper disposed on a first end of said second shaft and aligned thereon along the same longitudinal axis as a first bumper stop to impact therewith and to dampen the impact momentum of said first shaft when said second shaft is urged to travel in a first direction when said armature is pulled into the magnetic field formed by said solenoid and said magnetic frame upon the application of an electrical signal to said solenoid;

a second resilient bumper disposed on a second end of said second shaft and aligned thereon along the same longitudinal axis as a second bumper stop to impact with said second bumper stop and to dampen the impact momentum of said first shaft when said second shaft is urged to travel in a second direction upon the removal of said electrical signal from said solenoid; bumper stop;

whereby said first and second bumpers are disposed behind both said applicator and said armature such that said bumpers are outside the area of separation between said pole pieces, and whereby the said pole pieces have a maximum separation at said one end thereof to provide clearance for the diameter of said first shaft so that said pole pieces will not interfere with the reciprocating travel thereof.

2. The therapeutic percussor apparatus as claimed in claim 1 wherein said predetermined distance separating said pole pieces and said first shaft is approximately 1/16 inch.

3. The therapeutic percussor apparatus defined by claim 1 wherein said predetermined distance separating said pole pieces and said armature is approximately 0.003 inch.

4. The therapeutic percussor apparatus defined by claim 1 further comprising a hand holdable housing enclosing said reciprocal motor means and said power supply means.

5. The therapeutic percussor apparatus defined by claim 1 wherein the travel of said armature is limited to a distance of approximately 0.140 inch in each of said first and second directions by said first and second bumpers respectively.

6. In a hand held therapeutic percussor apparatus having an applicator, reciprocal motor means for imparting a reciprocal motion to said applicator, power supply means for controlling the frequency and power of said reciprocal motion, said motor means including an armature, a first shaft coupled at a first end to a first end of said armature and coupled at a second end to said applicator, a second shaft coupled at a first end to a second end of said armature, wherein said first shaft, said second shaft and said armature are substantially aligned along the same longitudinal axis, a means for resiliently holding said armature in a predetermined position, the improvement comprising:

a solenoid having an opening defined along its longitudinal axis;

a magnetic frame substantially surrounding said solenoid, said magnetic frame defined by two pole pieces, said frame having a single substantially rectangular opening at one end thereof adjacent to said first shaft, such that each said pole piece is separated from said shaft by a preselected distance of approximately 1/16 of an inch, wherein said rectangular opening has approximately the same cross-sectional area as the cross-section of said armature, and wherein the contacting surface of said armature and said solenoid form a bearing surface such that said armature is constrained from rotational movement about its longitudinal axis;

a first resilient bumper disposed on a first end of said second shaft and aligned thereon along the same longitudinal axis as a first bumper stop to impact therewith and to dampen the impact momentum of said shaft when said second shaft is urged to travel in a first direction when said armature is pulled into the magnetic field formed by said solenoid and said magnetic frame upon the application of an electrical signal to said solenoid;

a second resilient bumper disposed on a second end of said second shaft and aligned thereon along the same longitudinal axis as a second bumper stop to impact with an opposing second stop and to dampen the impact momentum of said first shaft when said second shaft urged to travel in a second direction upon the removal of said electrical signal from said solenoid;

a biasing spring disposed on said second shaft between said first stop and said second stop;

a first spring and end-retainer coupled to said second shaft for retaining said spring from sliding off said second end of said second shaft, and a second spring retainer disposed such that said biasing spring biases siad second shaft inwardly whereby said first bumper will urgently abut said first bumper stop;

whereby said first and second bumpers are disposed behind both said applicator and said armature such that said bumpers are outside the area of separation between said pole peices; said pole pieces have a maximum separation at said one end thereof to provide clearance for the diameter of said first shaft so that said pole pieces will not interfere with the reciprocating travel thereof; and whereby said bumpers limit the travel of said armature to a distance of less than $\frac{1}{4}$ of an inch for optimizing the cyclic return rate of said applicator to provide selected percussive frequency and impact for medical applications.

7. The therapeutic percussor apparatus defined by claim 6 further comprising thermal protection means for providing a warning signal when a first preselected operating temperature is reached, and for shutting off electrical power to said solenoid when a second preselected operating temperature is reached.

* * * * *